(12) United States Patent
Soulios et al.

(10) Patent No.: US 8,402,119 B2
(45) Date of Patent: Mar. 19, 2013

(54) REAL-LOAD TUNING OF DATABASE APPLICATIONS

(75) Inventors: Dimitrios Soulios, Seattle, WA (US); Shireesh K. Thota, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 153 days.

(21) Appl. No.: 12/895,615

(22) Filed: Sep. 30, 2010

(65) Prior Publication Data

US 2012/0084407 A1    Apr. 5, 2012

(51) Int. Cl.
*G06F 15/16* (2006.01)
*G06F 15/177* (2006.01)

(52) U.S. Cl. ........ 709/220; 709/201; 709/202; 709/203; 709/221; 709/222; 709/248

(58) Field of Classification Search .......... 709/201–203, 709/220–222, 248
See application file for complete search history.

(56) References Cited

U.S. PATENT DOCUMENTS

| | | | |
|---|---|---|---|
| 6,266,661 B1 * | 7/2001 | Lewish et al. ...................... | 1/1 |
| 6,567,767 B1 | 5/2003 | Mackey et al. | |
| 6,799,213 B1 | 9/2004 | Zhao et al. | |
| 7,664,778 B2 | 2/2010 | Yagoub et al. | |
| 2004/0103078 A1 * | 5/2004 | Smedberg et al. ................ | 707/1 |
| 2006/0085484 A1 * | 4/2006 | Raizman et al. ............. | 707/200 |
| 2008/0052271 A1 | 2/2008 | Lam | |
| 2008/0052344 A1 * | 2/2008 | Alecci et al. .................. | 709/203 |
| 2009/0070771 A1 | 3/2009 | Yuyitung et al. | |
| 2009/0150885 A1 * | 6/2009 | Safari et al. ...................... | 718/1 |
| 2009/0319249 A1 | 12/2009 | White et al. | |

FOREIGN PATENT DOCUMENTS

WO    WO2005116871 A1    12/2005

OTHER PUBLICATIONS

Mary Jo Foley, Microsoft says server application virtualization coming in second half of 2011, Pub. Date: Jun. 9, 2010, (2 pages).
Alex Lang, IBM WebSphere Portal: Performance testing and analysis, Pub. Date: Jul. 1, 2008, (15 pages).
John Fontana, Microsoft designing server-based application virtualization, Pub. Date: May 1, 2008, (6 pages).

* cited by examiner

*Primary Examiner* — David Lazaro
*Assistant Examiner* — Edward Kim
(74) *Attorney, Agent, or Firm* — Workman Nydegger

(57) ABSTRACT

A database environment that includes one or more database production servers, one or more database test servers, and a virtualization connection that provides incoming service request traffic to both the database production server and the database test server. However, the database production server responds to the database service requests, while the database test server does not. The database test server may be tested for a variety of different configurations in an attempt to find a better performing configuration. The testing is in real-time as the database test server is subjected to the same incoming service request traffic as the database production server.

12 Claims, 6 Drawing Sheets

REAL-LOAD TUNING OF DATABASE APPLICATIONS

BACKGROUND

A database is an organized collection of data records, and is tremendously useful for data-intensive applications and services. There are a variety of services that are offered over a network such as the interne, many of those services relying on the proper functionality of a database. In order to properly interface with the available databases, the service typically include one or more server computing systems (referred to as "servers").

The database test server may be tested for a variety of different configurations in an attempt to find a better performing configuration. The testing is in real-time as the database test server is subjected to the same incoming service request traffic as the database production server. As the database test server experiences different configurations, each configuration is recorded. Perhaps then the user may navigate to a particular configuration, and then perhaps alter the configuration in a different direction, potentially generating a hierarchical tree of recorded configurations. Upon finding an acceptable configuration, the configuration may then be applied to product by, for example, making the database test server become the database production server, or by copying the acceptable configuration back to the database production server.

BRIEF SUMMARY

At least one embodiment described herein relates to a database environment that includes a database production server, a database test server, and a virtualization connection that provides incoming service request traffic to both the database production server and the database test server. However, the database production server responds to the database service requests, while the database test server does not. The principles described herein may include multiple database production servers and/or multiple database test servers, though not required.

The database test server may be tested for a variety of different configurations in an attempt to find a better performing configuration. The testing is in real-time as the database test server is subjected to the same incoming service request traffic as the database production server. As the database test server experiences different configurations, each configuration is recorded. Perhaps then the user may navigate to a particular configuration, and then perhaps alter the configuration in a different direction, potentially generating a hierarchical tree of recorded configurations. Upon finding an acceptable configuration, the configuration may then be applied to product by, for example, making the database test server become the database production server, or by copying configuration back to the database production server.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, a database environment includes a database production server, a database test server, and a virtualization connection that provides incoming service request traffic to both the database production server and the database test server. However, the database production server responds to the database service requests, while the database test server does not. The database test server may be tested for a variety of different configurations in an attempt to find a better performing configuration. The testing is in real-time as the database test server is subjected to the same incoming service request traffic as the database production server. Though not required, the principles described herein may include multiple database production servers and/or multiple database test servers. First, some introductory discussion regarding computing systems will be described with respect to FIG. 1. Then, the embodiments of the database environment and processes for operation will be described with respect to FIGS. 2 through 7.

Figure 1:
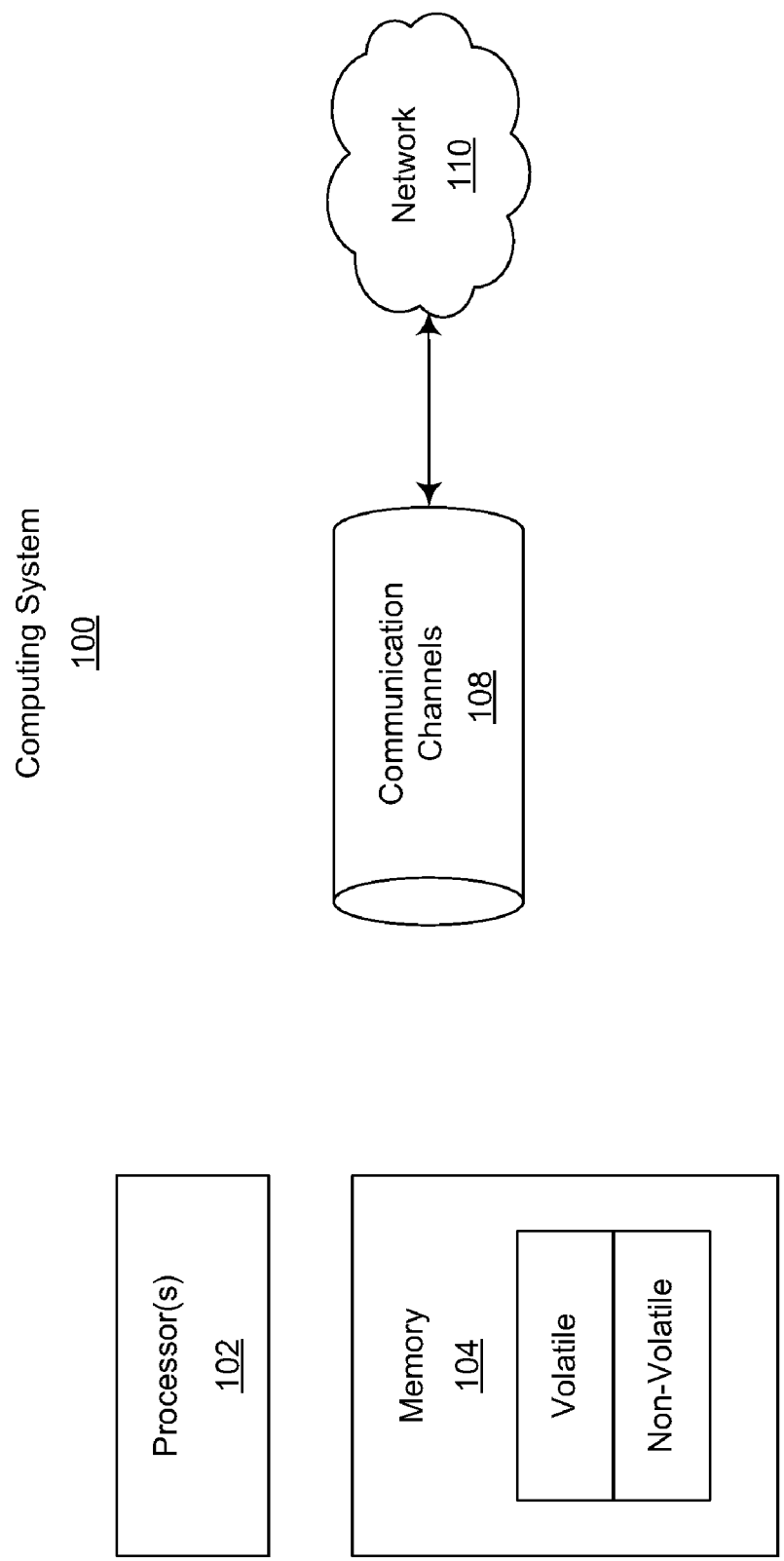
FIG. 1 illustrates an example computing system that may be used to employ embodiments described herein.

First, introductory discussion regarding computing systems is described with respect to FIG. 1. Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
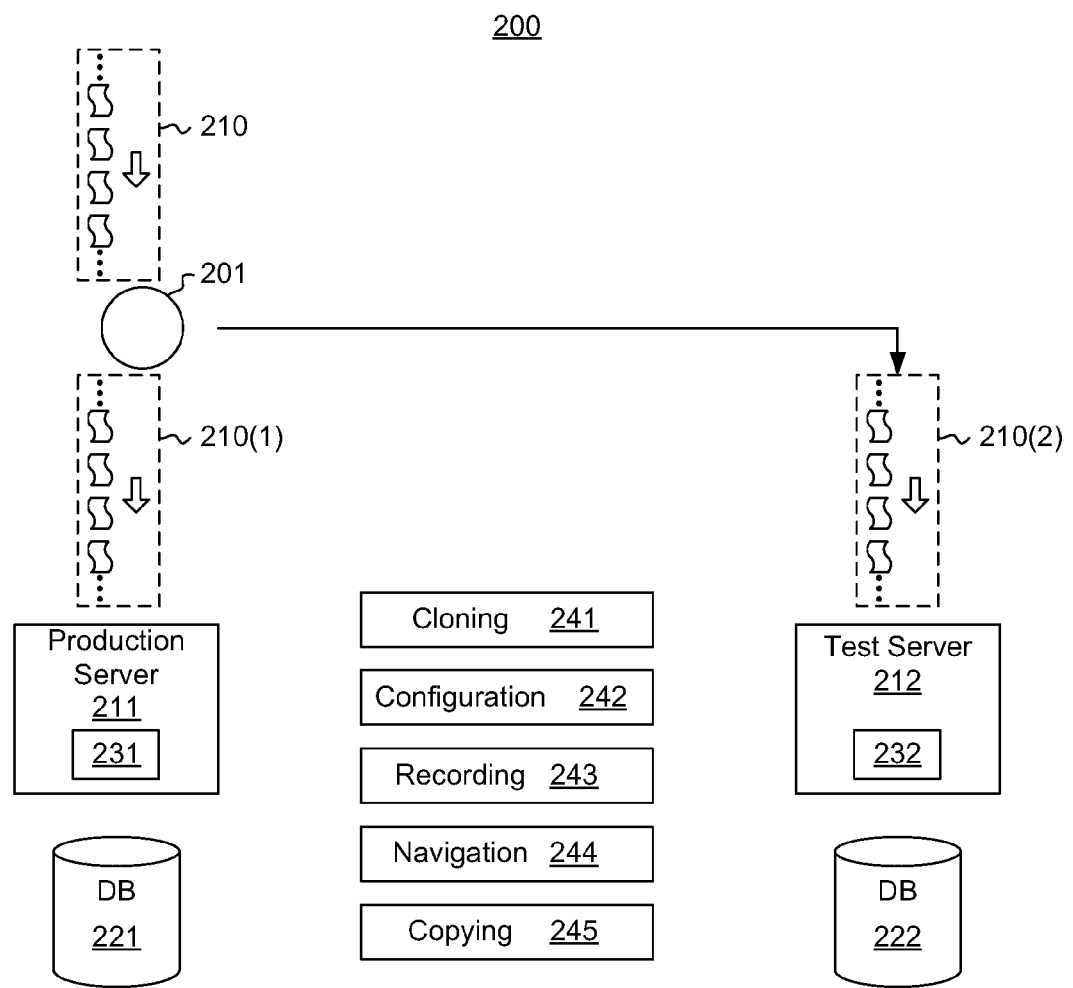
FIG. 2 illustrates a database environment in which the principles described herein may operate, and that includes a database production server and a database test server.

FIG. 2 illustrates a database environment 200 in which the principles described herein may operate. The database environment 200 includes a virtualization connection 201 that receives incoming service request traffic 210 from a network, and clones the incoming service request traffic for both a database production server and a database test server. Thus, the incoming service request traffic 210(1) is provided from the virtualization connection 201 to the database production server 211, and another instance of the incoming service request traffic 210(2) is provided from the virtualization connection 201 to the database test server 212. In one embodiment, the incoming service request traffic 210(1) provided to the database product server 211 is identical to the incoming service request traffic 210(2) provided to the database test server 212. Each server 211 or 212 may be a single computing system, or a number of distributed computing systems. The incoming service request traffic 210 may already have been subject to a load balancer. Thus, the incoming service request traffic 210 need not be all of the traffic that is destined for the service, and there may be other production servers not illustrated in FIG. 2.

The database production server 211 operates upon a database 221. The database production server 211 receives the incoming service request traffic 210(1) and processes the incoming service request traffic 210(1). In processing each incoming service request, the database production server 211 interfaces with the database 221 as appropriate. If needed, the database production server 211 then responds to the request. The database production server 211 has a particular configuration 231. Depending on the particular configuration 231, the database production server 211 may be more or less efficient at handling certain kinds of incoming service requests.

The database test server 212 also receives incoming service request traffic 210(2) and processes the incoming service request traffic 210(2). In processing each incoming service request, the database test server 211 interfaces with a database 222 as appropriate. If the request would normally require a response, the database test server 212 may perhaps generate a response, but does not dispatch the response to the originator of the request. Instead, as mentioned above, since the database production server 211 also receives the request, and dispatches a response, it is unnecessary for the database test server 212 to dispatch the response. In fact, if a response was dispatched by the database test server 212, the system would be dysfunctional as a query is not expected to generated different sets of results. The database test server 212 also has a particular configuration 232. Once again, depending on the particular configuration 232, the database test server 212 may be more or less efficient at handling certain kinds of incoming service requests.

The database test server 212 may operate on the database 222 without affecting the database 221 accessed by the database production server 211. For instance, the database 222 may be a copy of the database 221. Alternatively or in addition, the database 222 may be an isolated database that is derived from the database 221 (e.g., perhaps using a change or delta file). In the latter case, when the database test server 212 writes to the database 222, the database test server 212 simply writes to the delta file, but does not write to the database 221. When the database test server 212 reads from the database 222, the database test server 212 reads the database 221 in light of the delta file. This makes it appear to the database test server 212 as though it was accessing a distinct database 222, without requiring a full copy of the database, and while still maintaining isolation between the database test server 212 and the database 221 that is accessed by the database production server 211.

Thus, the database test server 212 simulates a real-time operating environment because it receives and processes the same incoming service request traffic as the database production server 211. The database test server 212 may even go as far as to generate (but not dispatch) appropriate responses to the incoming service requests. Thus, the database test server 212 experiences the same working conditions as the database production server 211, except for the fact that the configuration 232 of the database test server 212 may be altered as compared to the configuration 231 of the database production server 211.

The environment 200 also includes a number of other components 241 through 245, which may be offered by one or both of the servers 211 and 212, and/or perhaps by an external system (not shown). The functionality of the other components 241 through 245 will be described with respect to FIGS. 3 through 7, which describe an example operation of the database environment. Nevertheless, the functionality of components 241 through 245 will now be briefly described.

In particular, the components include a cloning interface 241 that permits the configuration of the database production server to be cloned to the database test server. For instance, the cloning interface 241 may be used to make the configuration 232 of the database test server 212 to be identical to the configuration 231 of the database production server 211. The cloning interface 241 may also have cloned the database 221 such that the database 222 accessed by the database test server 212 at least initially has the same state as the database 221 accessed by the database production server 211. One mechanism for cloning is through the use of the data-tier application component (or "DAC"), which packages configuration information for database servers along with the database object's schema.

A configuration interface 242 may be used to manipulate the configuration 232 of the database test server 212. Thus, the configuration interface 242 may be used to vary the configuration of the database test server 212 to test whether some other configuration of the database production server 211 would operate better for the kinds of incoming service requests being processed. In this description and in the claims, the "configuration" of the database server (whether database production server or database test server) is to be interpreted broadly to include any setting or data that may affect the operation of the database server.

A recording component 243 is configured to record a state of configuration of the database test server at various instants in time. Again, the DAC system may be used to record the configurations of the database test server.

Figure 3A:
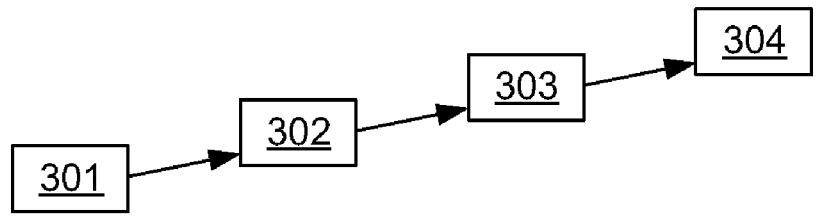
FIG. 3A illustrates a first stage in a generation of an example hierarchy of recorded configurations.
Figure 3B:
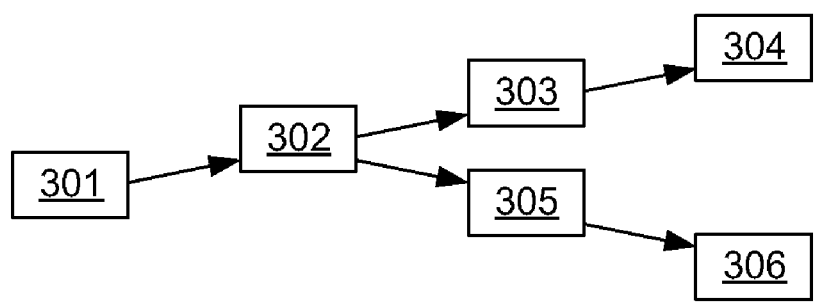
FIG. 3B illustrates a second stage in the generation of the example hierarchy of recorded configurations.

A navigation interface 244 allows the state of the database test server to be migrated to any one of the prior recorded of states recorded by the recording component 243. By using the recording component 243 and the navigation interface 244, a hierarchy of recorded configuration states may be generated. The generation of a simply hierarchy example will now be described with reference to FIGS. 3A and 3B. Suppose, as shown in FIG. 3A, that the database test server has had its configuration recorded for times resulting in configuration recordings 301, 302, 303 and 304 recorded in sequence in time. Now suppose the user navigates back to state 302, so that this recorded configuration is restored to the database test server. Now, as shown in FIG. 3B, the configuration is altered and recorded two further times, resulting in additional configuration recordings 305 and 306. FIGS. 3A and 3B illustrated a simple hierarchy of configuration recordings, though much more complex hierarchies may also be generated.

A copying component 245 permits the configuration of the database test server to be copied back to the database production server. Once a desirable configuration setting is found that results in good performance of the database test server, that configuration information may be copied back to the database production server. Alternatively, the database test server may be configured to be the database production server and vice versa, through appropriate reconfiguration of the virtualization connection 201.

Figure 4:
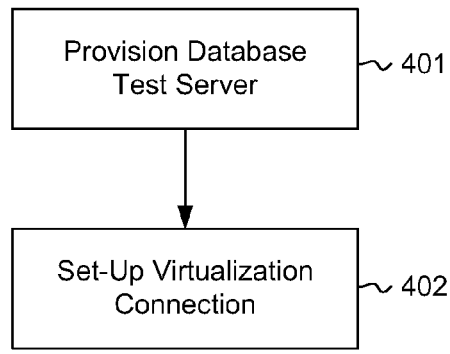
FIG. 4 illustrates a flowchart of a method for preparing a database test server for test.

FIG. 4 illustrates a flowchart of a method 400 for preparing a database test server for test. The methods of FIGS. 4, 5 and 7 will now be described with frequent reference to FIG. 4.

The database test server is provisioned in the service environment that includes the database production server (act 401). For instance, referring to FIG. 2, the database test server 212 is set up in the environment 200. This provisioning might also include cloning the database test server 212 so that it operates roughly the same as the database production server 211. This may be accomplished by the cloning component 241 copying the configuration from the database production server 211 such that the configuration 232 of the database test server 212 is the same as the configuration 231 of the database production server 211. Furthermore, the cloning component 241 may give access to a copy of the database to the database test server. For instance, the database test server 212 is given access to the database 222, which at least at first, may appear the same as the database 221.

In addition to provisioning the database test server 212, the virtualization connection is set up (act 402) to receive incoming service request traffic to be handled by the database production server 211. Furthermore, the virtualization connection is set up to copy the incoming service request traffic such that identical flows of the incoming service request traffic are channeled to both the database production server 211 and the database test server 212. For instance, in FIG. 2, copies of the incoming service request traffic are channeled to the database production server 211 (i.e., traffic 210(1)) as well as to the database test server 212 (i.e., traffic 210(2)).

Figure 5:
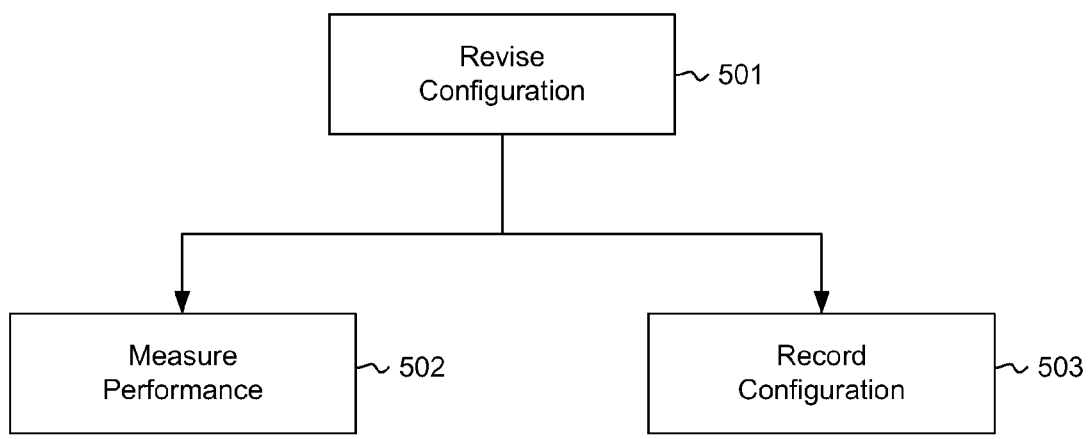
FIG. 5 illustrates a flowchart of a method for testing the database test server.

FIG. 5 illustrates a flowchart of a method 500 for testing the database test server. After the database test server 212 is cloned to match the database production server 211, the configuration interface 242 may be used to experiment with various configurations of the database test server 212 without affecting the configuration 231 of the database production server. There may thus be any number of revisions made to the configuration 232, from one to perhaps enumerable according to the desires of the tester. The method 500 may be performed for each revision of the configuration 232 of the database test server 212.

For each revision, the database test server is re-configured (act 501) to have a particular configuration. For instance, in FIG. 2, the configuration interface 242 may be used by the tester to experiment with a new configuration 232 of the database test server 212. Alternatively, the navigation interface 244 may be used by the tester to restore or return to a prior recorded configuration of the database test server 212. For instance, as explained with respect to FIGS. 3A and 3B, complex hierarchies of recorded configurations may be created using the navigation interface 244 and the configuration interface 242.

For one or more of the revisions, the performance of the database test server is measured (act 502) so as to determine whether or not the configuration works well or not. For instance, the tester might measure processor utilization, response time, errors, and the like.

In addition, for one or more of the revisions, the configuration state is recorded (act 503). For instance, the DAC system may be used to package the configuration state in a compact way. Each time the configuration state is recorded, the recorded state represents a new node in a hierarchically structure of recorded configuration states. Referring to FIG. 2, this recording may be performed by the recording component 243.

Once a good configuration is found for the database test server 212, that configuration may then be applied to production. This may be accomplished by switching the roles of the database servers 211 and 212, such that the database test server 212 is used for production (and thereby generating and dispatching responses), and the database production server 211 is used as a test server.

Alternatively, instead of switching roles, the good configuration discovered for the database test server (whether the current state of the database test server, or whether some prior recorded state) may be applied back to the database production server. The DAC system may be used to accomplish this.

Figure 6:
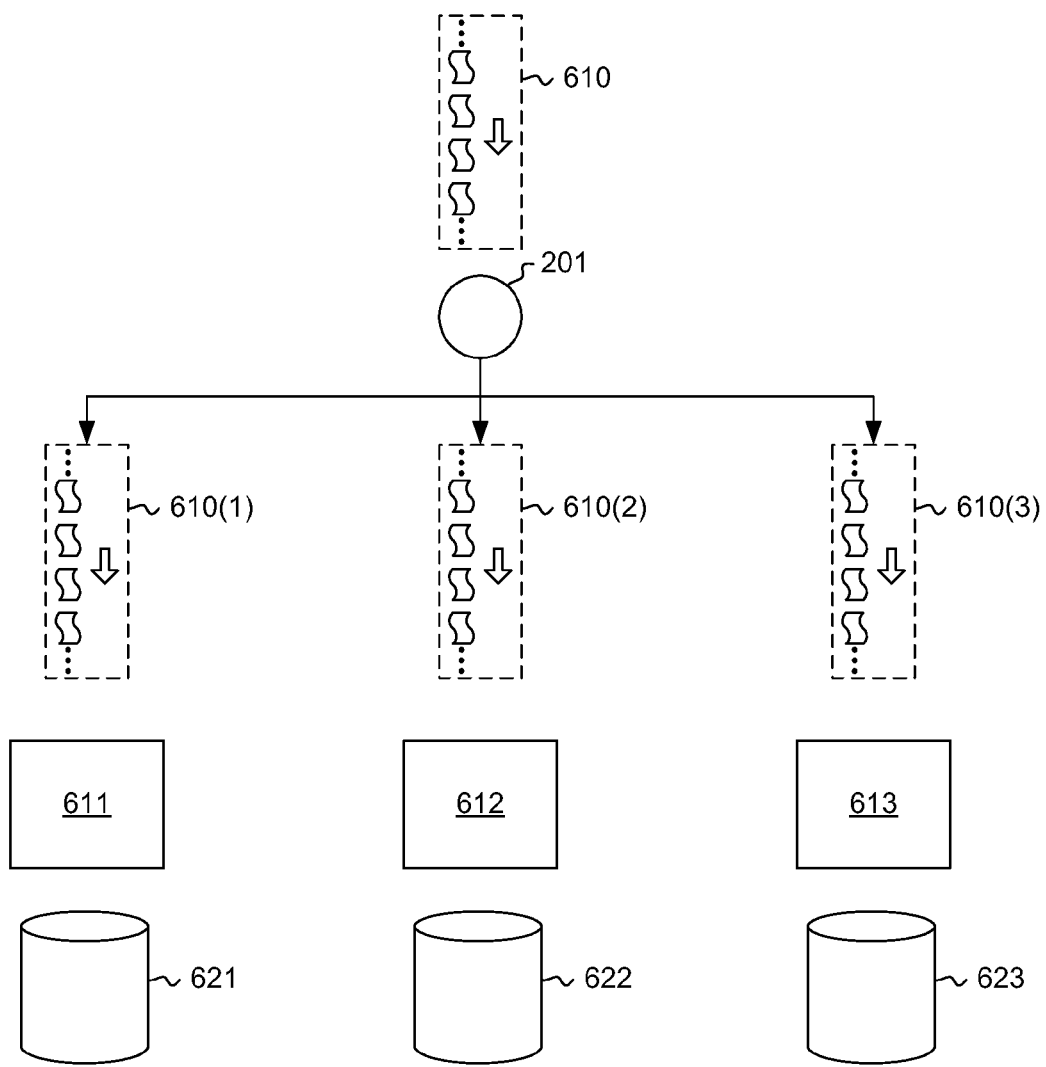
FIG. 6 illustrates a database environment in which the principles described herein may operate, and that includes three database servers in which there are multiple database productions servers or multiple database test servers.

FIG. 6 illustrates a database environment 600 in which there are multiple productions servers. In this embodiment, there are three servers 611, 612 and 613 having access to corresponding databases 621, 622 and 623. The database environment 600 is provided to illustrated there may be perhaps multiple production servers in operation, and perhaps multiple test servers also in operation.

For instance, suppose that servers 611 and 612 are production servers and server 613 is a test server. The servers 611 and 612 might each be active during particular time periods. For instance, server 611 might be active during the day and suitably configured for incoming service request traffic that might be expected during the day, and server 612 might be active during the night and suitably configured for incoming service request traffic that might be expected during the night. The database test server 613 may be used to test whichever of the database production servers 611 or 612 is currently active. This is an example of the broader principle in which the servers 611 and 612 may have multiple concurrent configurations that can dynamically change in real time based on different workloads applied to the system. This gives the ability to have multiple stored configurations that may automatically switch in order to provide the optimal performance at any given time.

As another example, suppose there is only one production server 611 and two test servers 612 and 613. The same tester, or perhaps different testers, may use each test server 612 and 613 to independently test different configurations to generate distinct recorded configuration trees.

Figure 7:
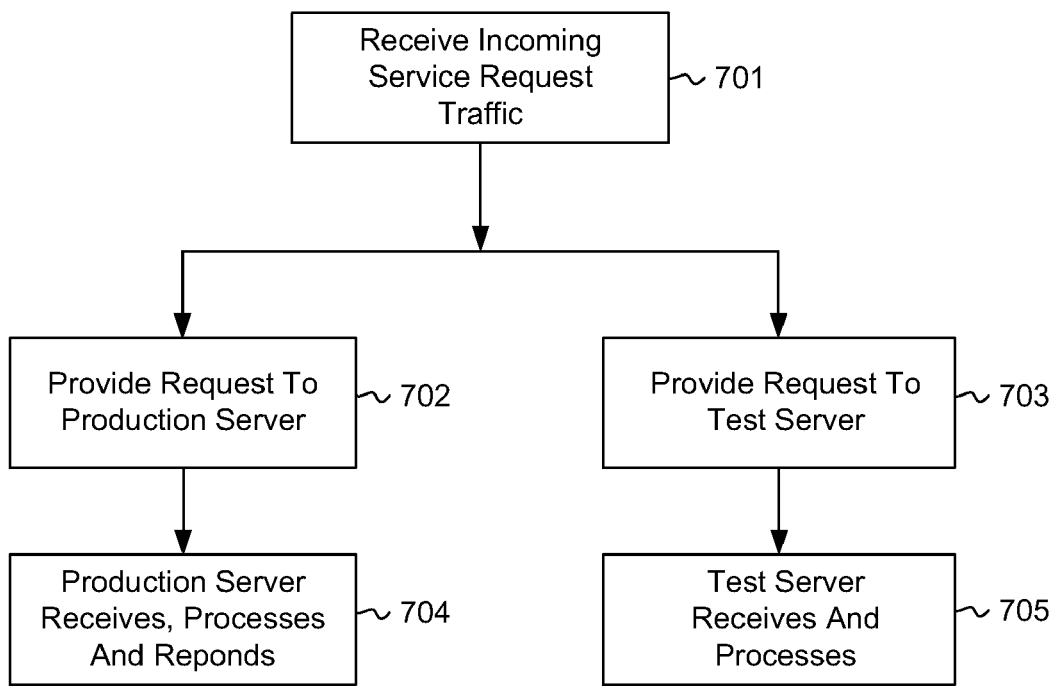
FIG. 7 illustrates a flowchart of a method for operating a database environment.

For completeness, FIG. 7 illustrates a flowchart of a method 700 for operating a database environment. The environment receives incoming service request traffic (act 701). For each service request, the virtualization connection provides the incoming service request to a database production server (act 702) as well as to the database test server (act 703). The database production server receives, processes, and responds to the incoming service request (act 704), whereas the database test server receives and processes the incoming service request (act 705). The database test server may also generate a response, but does not dispatch the response.

Accordingly, the principles described herein permit for more accurate and real-time testing of various database configurations without impeding the ability of actual production servers to respond to service requests. Thus, the business of the service may continue, while testing for alternative configurations that might cause the service performance to improve even further.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer-implemented method for tuning a database server, implemented in a computer system that includes a production server that processes incoming service requests and returns appropriate data from a database accessed by the database server, and a test server, the method comprising the following acts:

preparing a database for use by the test server that is based on the database accessed by the production server;

preparing for the test server an initial configuration that is a copy of a configuration in use at the production server;

receiving at a virtualization connection incoming service request traffic;

cloning at the virtualization connection the incoming service request traffic so that the incoming traffic request is provided to the production server, and a cloned copy of the incoming traffic request is directly provided in real-time from the virtualization connection to the test server, so that both the production server and the test server process the same incoming traffic requests;

at the test server, testing the cloned incoming service request traffic using one or more new database configurations that differ from the initial configuration copied from the production server;

recording in a hierarchy various of the one or more new database configurations tested;

at the test server, navigating the hierarchy to a selected one of the new configurations tested that improves processing for the incoming service request traffic; and using the selected new tested configuration to thereafter process incoming service request traffic for the database accessed by the production server.

2. The method in accordance with claim 1, wherein the performance of each new database configuration that is tested at the test server is measured and recorded in the hierarchy with the test new configuration.

3. The method in accordance with claim 1, wherein the selected new configuration is a current configuration of the database test server.

4. The method in accordance with claim 3, wherein using the selected new tested configuration to process incoming service request traffic at the database of the production server comprises switching roles of the database production server and the database test server.

5. The method in accordance with claim 3, wherein using the selected new tested configuration to process incoming service request traffic at the database of the production server comprises replacing the configuration currently in use at the production server with a copy of the selected new tested configuration.

6. The method in accordance with claim 1, wherein the database production server is but one of a plurality of database production servers, and wherein the method is further comprised of the following acts:

identifying which of the plurality of database production servers the selected new configuration is to be applied to; and enforcing the selected new configuration on the identified database production server.

7. The method in accordance with claim 1, wherein preparing the database for use by the test server that is based on the database accessed by the production server comprises making a copy of the database accessed by the production server.

8. The method in accordance with claim 1, wherein preparing the database for use by the test server that is based on the database accessed by the production server comprises using a delta file in conjunction with the database that is accessed by the production server.

9. At least one physical storage device with stored computer-executable instructions, which, when processed by one or more processors, cause execution of the following acts:

preparing a database for use by the test server that is based on the database accessed by the production server;

preparing for the test server an initial configuration that is a copy of a configuration in use at the production server;

receiving at a virtualization connection incoming service request traffic;

cloning at the virtualization connection the incoming service request traffic so that the incoming traffic request is provided to the production server, and a cloned copy of the incoming traffic request is directly provided in real-time from the virtualization connection to the test server, so that both the production server and the test server process the same incoming traffic requests;

at the test server, testing the cloned incoming service request traffic using one or more new database configurations that differ from the initial configuration copied from the production server;

recording in a hierarchy various of the one or more new database configurations tested;

at the test server, navigating the hierarchy to a selected one of the new configurations tested that improves processing for the incoming service request traffic; and using the selected new tested configuration to thereafter process incoming service request traffic for the database accessed by the production server.

10. A computer-implemented method for tuning a database server, implemented in a computer system that includes a production server that processes incoming service requests and returns appropriate data from a database accessed by the database server, and a test server, the method comprising the following acts:

preparing a database for use by the test server that is based on the database accessed by the production server;

preparing for the test server an initial configuration that is a copy of a configuration in use at the production server;

receiving at a virtualization connection incoming service request traffic;

cloning at the virtualization connection the incoming service request traffic so that the incoming traffic request is provided to the production server, and a cloned copy of the incoming traffic request is directly provided in real-time from the virtualization connection to the test server, so that both the production server and the test server process the same incoming traffic requests;

at the database test server, testing the cloned incoming service request traffic using one or more new database configurations that differ from the initial configuration copied from the production server;

recording in a hierarchy various of the one or more new database configurations tested;

at the test server, navigating the hierarchy to a selected one of the new configurations tested that improves processing of the incoming service request traffic; and using the selected new tested configuration to thereafter process incoming service request traffic for the database accessed by the production server, wherein using the selected new tested configuration is comprised of either:

(i) copying the selected new tested configuration at the production server so the copied configuration replaces the configuration previously in use at the production server; or (ii) using the selected new tested configuration at the test server, and using the test server as the production server, and using the production server as the test server.

11. The method of claim 10, wherein the method is implemented by computer-executable instructions stored on physical storage media, and which, when processed by one or more processors, cause execution of the method with the computer system.

12. A system for tuning a database server comprising:

a production server with one or more processors and a first database accessed by the production server when processing incoming service request traffic;

a test server with one or more processors that test different configurations for processing the incoming service request traffic, and a second database derived from the first database, the second database being accessed by the test server;

a virtualization connection that receives incoming service request traffic and that clones the incoming service request traffic so that the incoming traffic request is directly provided to the production server, and a cloned copy of the incoming traffic request is directly provided in real-time from the virtualization connection to the test server, so that both the production server and the test server process the same incoming traffic requests;

a cloning interface that clones an initial configuration of the production server and provides a copy thereof for use as the test server's initial configuration;

a configuration interface that varies the configuration of the test server so that the cloned incoming service request traffic is tested using one or more new database configurations;

a recording component, associated with at least one of the test server or the production server, that records in the form of a hierarchy at least some new configurations tested at the test server;

a navigation interface that provides navigation of the hierarchy in order to select a new configuration for use that improves processing of the incoming service request traffic; and a copying component, associated with at least one of the test server or the production server, that provides copying a selected new configuration from the test server to the production server.

* * * * *